(12) United States Patent
Meiri et al.

(10) Patent No.: US 8,977,826 B1
(45) Date of Patent: Mar. 10, 2015

(54) EXTENT COMMANDS IN REPLICATION

(75) Inventors: David Meiri, Cambridge, MA (US); Dan Arnon, Somerville, MA (US); Benjamin W. Yoder, Westborough, MA (US); Mark J. Halstead, Holliston, MA (US); Assaf Natanzon, Tel Aviv (IL)

(73) Assignee: EMC Corporation, Hopkinton, MA (US)

( * ) Notice: Subject to any disclaimer, the term of this patent is extended or adjusted under 35 U.S.C. 154(b) by 539 days.

(21) Appl. No.: 13/338,788

(22) Filed: Dec. 28, 2011

(51) Int. Cl.
*G06F 12/00* (2006.01)
*G06F 13/00* (2006.01)
*G06F 13/28* (2006.01)
*G06F 11/20* (2006.01)
*G06F 3/06* (2006.01)
*G06F 11/14* (2006.01)

(52) U.S. Cl.
CPC ........ *G06F 11/2056* (2013.01); *G06F 11/2074* (2013.01); *G06F 11/2066* (2013.01); *G06F 3/065* (2013.01); *G06F 11/1471* (2013.01); *G06F 2201/855* (2013.01)
USPC ............................ 711/162; 711/159; 711/161

(58) Field of Classification Search
CPC ............ G06F 11/2056; G06F 11/2066; G06F 11/2074; G06F 11/1471; G06F 2201/855
USPC .......................................... 711/159, 161, 162
See application file for complete search history.

(56) References Cited

U.S. PATENT DOCUMENTS

| | | | | |
|---|---|---|---|---|
| 7,542,986 | B2 * | 6/2009 | Lubbers et al. | 1/1 |
| 7,552,294 | B1 * | 6/2009 | Justiss | 711/161 |
| 8,065,442 | B1 * | 11/2011 | Chatterjee et al. | 710/5 |
| 2004/0250031 | A1 * | 12/2004 | Ji et al. | 711/162 |
| 2006/0206542 | A1 * | 9/2006 | Wolfgang et al. | 707/203 |
| 2007/0130213 | A1 * | 6/2007 | Jean-Denis et al. | 707/200 |
| 2009/0300301 | A1 * | 12/2009 | Vaghani | 711/162 |
| 2013/0067174 | A1 * | 3/2013 | Moss et al. | 711/154 |

* cited by examiner

*Primary Examiner* — Matthew Bradley
*Assistant Examiner* — Rocio Del Mar Perez-Velez
(74) *Attorney, Agent, or Firm* — Krishnendu Gupta; Joseph D'Angelo

(57) ABSTRACT

A method, system, and computer program product for ordering a plurality of data IO captured at a primary site to be applied at a secondary site, comprising removing the one or more extent level portions from the captured data IO, determining if the one or more extent level portions are time sequenced to overwrite a portion of data of the data IO, based on a determination that the portion data is to be overwritten, removing the overwritten portion of data from the plurality of the data IO and ordering the one or more extent level portions to be applied at the secondary site before the captured data IO.

20 Claims, 17 Drawing Sheets

TIMELINE 810

CYCLE CREATED
BLOCKS 10-30 ARE WRITTEN
BLOCKS 40-50 WRITTEN
UNMAP 20-55
BLOCKS 22-25 ARE WRITTEN

FIG. 8

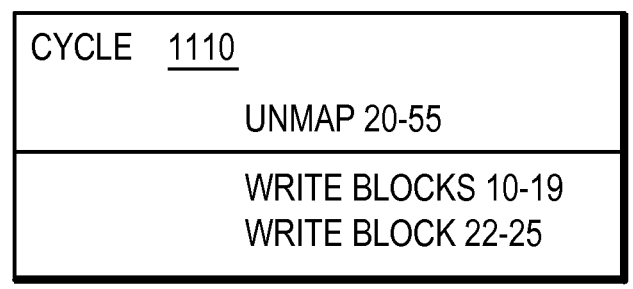
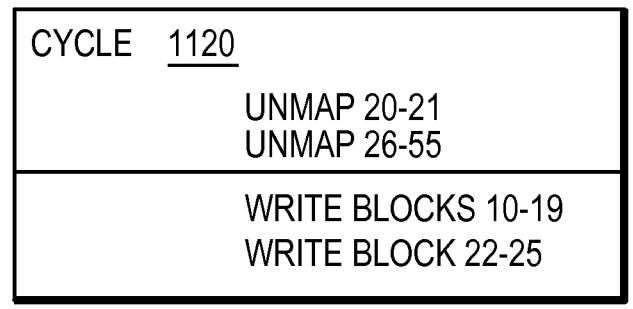
FIG. 11

TIMELINE  1310

T0: WRITE BLOCKS 15-20 ON VOLUME 2
T1 WRITE BLOCKS 15-20 ON VOLUME 1
T2: XCOPY BLOCKS 10-30 ON VOLUME 1 TO VOLUME 2
T3: WRITE BLOCKS 10-30 VOLUME 1
T4: WRITE BLOCKS 25-30 ON VOLUME 2

CYCLE  1320

XCOPY BLOCKS 10-30 V1 TO V2
WRITE BLOCKS 10-30 ON V1
WRITE BLOCKS 15-20 ON V2
WRITE BLOCKS 25-30 ON VOLUME 2

FIG. 13

TIMELINE  1510

T0: WRITE BLOCKS 15-20 ON VOLUME 2
T1 WRITE BLOCKS 15-20 ON VOLUME 1
T2: XCOPY BLOCKS 10-30 ON VOLUME 1 TO VOLUME 2
T3: WRITE BLOCKS 10-30 VOLUME 1
T4: WRITE BLOCKS 25-30 ON VOLUME 2

CYCLE  1520

XCOPY BLOCKS 10-30 V1 TO V2

WRITE BLOCKS 10-30 ON V1
WRITE BLOCKS 15-20 ON V2
WRITE BLOCKS 25-30 ON VOLUME 2

CYCLE  1530

XCOPY BLOCKS 10-14 VL TO V2
XCOPY BLOCKS 21-24 VL TO V2

WRITE BLOCKS 10-30 ON V1
WRITE BLOCKS 15-20 ON V2
WRITE BLOCKS 25-30 ON VOLUME 2

FIG. 15

EXTENT COMMANDS IN REPLICATION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Technical Field

This application relates to computer storage devices, and more particularly to the field of transferring data between storage devices.

2. Description of Related Art

Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

In some instances, it may be desirable to copy data from one storage device to another. For example, if a host writes data to a first storage device, it may be desirable to copy that data to a second storage device provided in a different location so that if a disaster occurs that renders the first storage device inoperable, the host (or another host) may resume operation using the data of the second storage device. Such a capability is provided, for example, by the Remote Data Facility (RDF) product provided by EMC Corporation of Hopkinton, Mass. With RDF, a first storage device, denoted the "primary storage device" (or "R1") is coupled to the host. One or more other storage devices, called "secondary storage devices" (or "R2") receive copies of the data that is written to the primary storage device by the host. The host interacts directly with the primary storage device, but any data changes made to the primary storage device are automatically provided to the one or more secondary storage devices using RDF. The primary and secondary storage devices may be connected by a data link, such as an ESCON link, a Fibre Channel link, and/or a Gigabit Ethernet link. The RDF functionality may be facilitated with an RDF adapter (RA) provided at each of the storage devices.

RDF allows synchronous data transfer where, after data written from a host to a primary storage device is transferred from the primary storage device to a secondary storage device using RDF, receipt is acknowledged by the secondary storage device to the primary storage device which then provides a write acknowledge back to the host. Thus, in synchronous mode, the host does not receive a write acknowledge from the primary storage device until the RDF transfer to the secondary storage device has been completed and acknowledged by the secondary storage device.

A drawback to the synchronous RDF system is that the latency of each of the write operations is increased by waiting for the acknowledgement of the RDF transfer. This problem is worse when there is a long distance between the primary storage device and the secondary storage device; because of transmission delays, the time delay required for making the RDF transfer and then waiting for an acknowledgement back after the transfer is complete may be unacceptable.

SUMMARY OF THE INVENTION

A method, system, and computer program product for ordering a plurality of data IO captured at a primary site to be applied at a secondary site, comprising removing the one or more extent level portions from the captured data IO, determining if the one or more extent level portions are time sequenced to overwrite a portion of data of the data IO, based on a determination that the portion data is to be overwritten, removing the overwritten portion of data from the plurality of the data IO and ordering the one or more extent level portions to be applied at the secondary site before the captured data IO.

BRIEF DESCRIPTION OF DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

FIG. 8 is a diagram illustrating timeline with an UNMAP command, in accordance with an embodiment of the present disclosure;

FIG. 11 is a diagram of two cycles, in accordance with alternative embodiments of the present disclosure;

FIG. 13 is a diagram illustrating timeline with an XCOPY command and a cycle, in accordance with an embodiment of the present disclosure;

FIG. 15 is a diagram illustrating timeline with an XCOPY command and two cycles, in accordance with embodiments of the present disclosure;

DETAILED DESCRIPTION

Generally, an extent is defined by one or more contiguous storage locations on a logical, virtual, or physical storage medium. Typically an extent-level write operation is a command that performs a write command on the extent. Conventionally, there are standards for extent commands such as the T10 SAM-5 standard that includes XCOPY, UNMAP and WRITE SAME as extent level write commands that form part of SCSI.

Usually, replication refers to creating a copy of data being written to one site at a second site. Replication is generally useful to ensure that if the site being copied crashes or loses data, the replication site may be able to provide a back-up of the data at the same or a similar point in time to the production site or site being copied.

However, conventional techniques may not be able to replicate both normal write IO and extent level commands extent level commands. Generally, this may be because replication may not occur synchronously, rather IO may be portioned into chunks and transmitted to the replication site, where write order of the IO in the chunks may not be enforced. However, extent level commands generally need to be executed in time consistent order with other IO commands or data inconsistency may occur.

A discussion of data writes and replication may be found in U.S. Pat. No. 7,054,883 entitled "VIRTUAL ORDERED WRITES FOR MULTIPLE STORAGE DEVICES" filed on Dec. 1, 2003 assigned to EMC Corp., which is hereby incorporated by reference.

A discussion of extents may be found in U.S. patent application Ser. No. 12/977,295 entitled "HIERARCHICAL COOPERATIVE STORAGE SERVICES" filed on Dec. 23, 2010 assigned to EMC Corp., which is hereby incorporated by reference.

Replication

Figure 1:
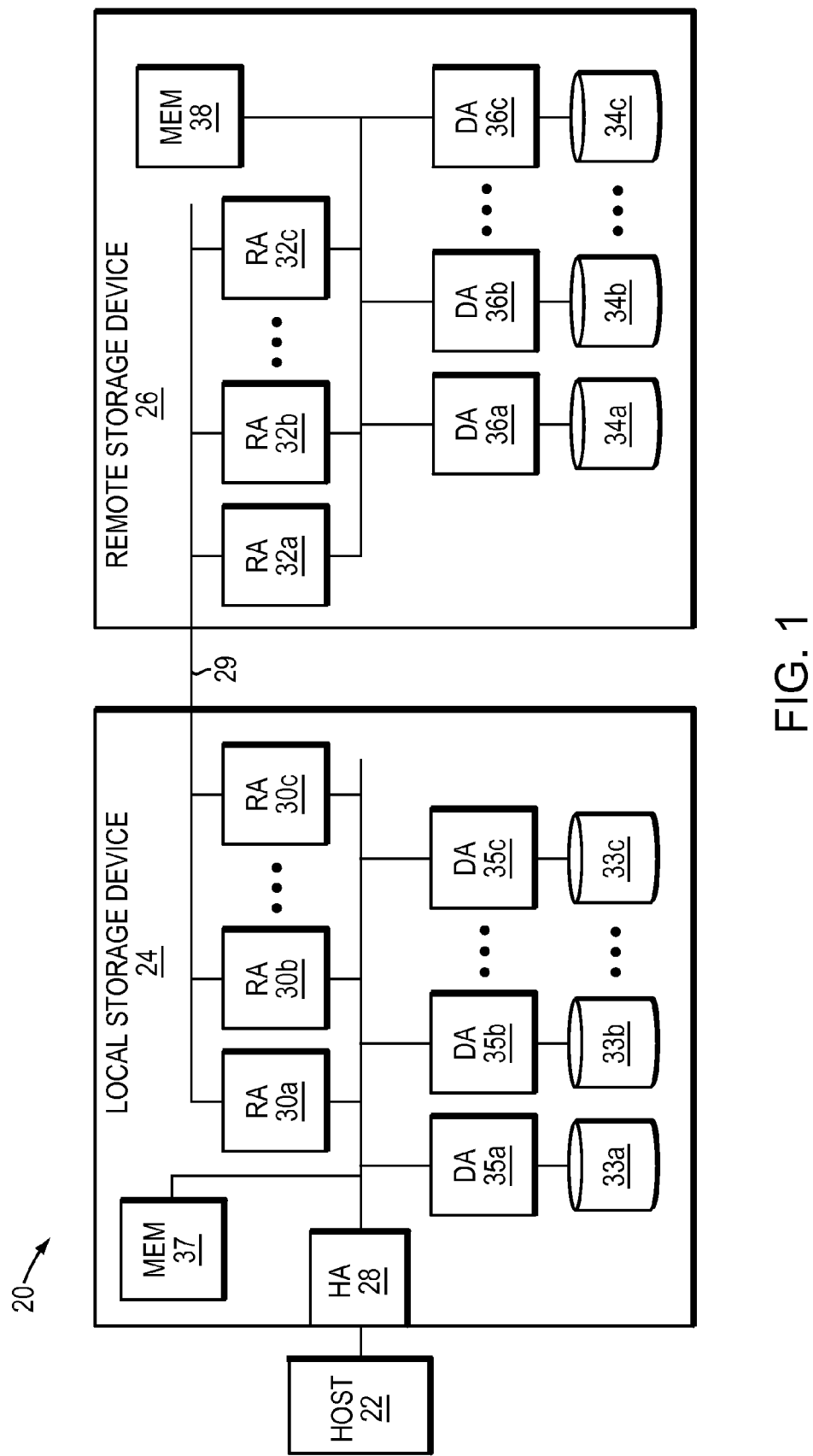
FIG. 1 is a schematic diagram showing a host, a local storage device, and a remote data storage device used in connection with the system described herein, in accordance with an embodiment of the present disclosure.

Referring to FIG. 1, a diagram 20 shows a relationship between a host 22, a local storage device 24 and a remote storage device 26. The host 22 reads and writes data from and to the local storage device 24 via a host adapter (HA) 28, which facilitates the interface between the host 22 and the local storage device 24. Although the diagram 20 only shows one host 22 and one HA 28, it will be appreciated by one of ordinary skill in the art that multiple HA's may be used and that one or more HA's may have one or more hosts coupled thereto.

Data from the local storage device 24 is copied to the remote storage device 26 via an RDF link 29 to cause the data on the remote storage device 26 to be identical to the data on the local storage device 24. Although only the one link 29 is shown, it is possible to have additional links between the storage devices 24, 26 and to have links between one or both of the storage devices 24, 26 and other storage devices (not shown). Note that there may be a time delay between the transfer of data from the local storage device 24 to the remote storage device 26, so that the remote storage device 26 may, at certain points in time, contain data that is not identical to the data on the local storage device 24. Communication using RDF is described, for example, in U.S. Pat. No. 5,742,792, which is incorporated by reference herein.

The local storage device 24 includes a first plurality of RDF adapter units (RA's) 30a, 30b, 30c and the remote storage device 26 includes a second plurality of RA's 32a-32c. The RA's 30a-30c, 32a-32c are coupled to the RDF link 29 and are similar to the host adapter 28, but are used to transfer data between the storage devices 24, 26. The software used in connection with the RA's 30a-30c, 32a-32c is discussed in more detail hereinafter.

The storage devices 24, 26 may include one or more disks, each containing a different portion of data stored on each of the storage devices 24, 26. FIG. 1 shows the storage device 24 including a plurality of disks 33a, 33b, 33c and the storage device 26 including a plurality of disks 34a, 34b, 34c. The RDF functionality described herein may be applied so that the data for at least a portion of the disks 33a-33c of the local storage device 24 is copied, using RDF, to at least a portion of the disks 34a-34c of the remote storage device 26. It is possible that other data of the storage devices 24, 26 is not copied between the storage devices 24, 26, and thus is not identical.

Each of the disks 33a-33c is coupled to a corresponding disk adapter unit (DA) 35a, 35b, 35c that provides data to a corresponding one of the disks 33a-33c and receives data from a corresponding one of the disks 33a-33c. Similarly, a plurality of DA's 36a, 36b, 36c of the remote storage device 26 are used to provide data to corresponding ones of the disks 34a-34c and receive data from corresponding ones of the disks 34a-34c. An internal data path exists between the DA's 35a-35c, the HA 28 and the RA's 30a-30c of the local storage device 24. Similarly, an internal data path exists between the DA's 36a-36c and the RA's 32a-32c of the remote storage device 26. Note that, in other embodiments, it is possible for more than one disk to be serviced by a DA and that it is possible for more than one DA to service a disk.

The local storage device 24 also includes a global memory 37 that may be used to facilitate data transferred between the DA's 35a-35c, the HA 28 and the RA's 30a-30c. The memory 37 may contain tasks that are to be performed by one or more of the DA's 35a-35c, the HA 28 and the RA's 30a-30c, and a cache for data fetched from one or more of the disks 33a-33c. Similarly, the remote storage device 26 includes a global memory 38 that may contain tasks that are to be performed by one or more of the DA's 36a-36c and the RA's 32a-32c, and a cache for data fetched from one or more of the disks 34*a*-34*c*. Use of the memories 37, 38 is described in more detail hereinafter.

The storage space in the local storage device 24 that corresponds to the disks 33*a*-33*c* may be subdivided into a plurality of volumes or logical devices. The logical devices may or may not correspond to the physical storage space of the disks 33*a*-33*c*. Thus, for example, the disk 33*a* may contain a plurality of logical devices or, alternatively, a single logical device may span both of the disks 33*a*, 33*b*. Similarly, the storage space for the remote storage device 26 that comprises the disks 34*a*-34*c* may be subdivided into a plurality of volumes or logical devices, where each of the logical devices may or may not correspond to one or more of the disks 34*a*-34*c*.

Providing an RDF mapping between portions of the local storage device 24 and the remote storage device 26 involves setting up a logical device on the remote storage device 26 that is a remote mirror for a logical device on the local storage device 24. The host 22 reads and writes data from and to the logical device on the local storage device 24 and the RDF mapping causes modified data to be transferred from the local storage device 24 to the remote storage device 26 using the RA's, 30*a*-30*c*, 32*a*-32*c* and the RDF link 29. In steady state operation, the logical device on the remote storage device 26 contains data that is identical to the data of the logical device on the local storage device 24. The logical device on the local storage device 24 that is accessed by the host 22 is referred to as the "R1 volume" (or just "R1") while the logical device on the remote storage device 26 that contains a copy of the data on the R1 volume is called the "R2 volume" (or just "R2"). Thus, the host reads and writes data from and to the R1 volume and RDF handles automatic copying and updating of the data from the R1 volume to the R2 volume.

Figure 2:
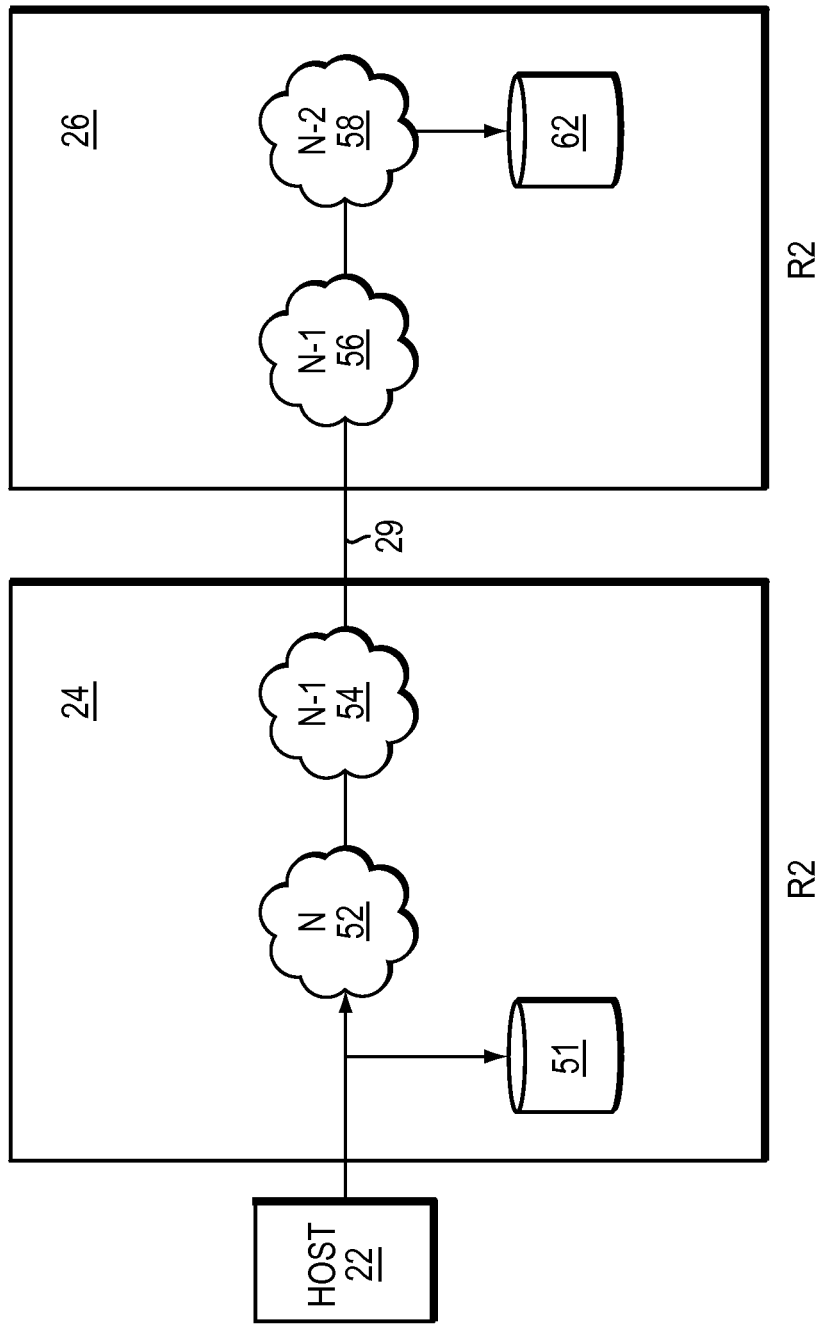
FIG. 2 is a schematic diagram showing a flow of data between a host, a local storage device, and a remote data storage device used in connection with the system described herein, in accordance with an embodiment of the present disclosure.

Referring to FIG. 2, a path of data is illustrated from the host 22 to the local storage device 24 and the remote storage device 26. Data written from the host 22 to the local storage device 24 is stored locally, as illustrated by the data element 51 of the local storage device 24. The data that is written by the host 22 to the local storage device 24 is also maintained by the local storage device 24 in connection with being sent by the local storage device 24 to the remote storage device 26 via the link 29.

In the system described herein, each data write by the host 22 (of, for example a record, a plurality of records, a track, etc.) is assigned a sequence number. The sequence number may be provided in an appropriate data field associated with the write. In FIG. 2, the writes by the host 22 are shown as being assigned sequence number N. All of the writes performed by the host 22 that are assigned sequence number N are collected in a single chunk of data 52. The chunk 52 represents a plurality of separate writes by the host 22 that occur at approximately the same time. The capture of these separate host writes may be referred to herein as the capture cycle.

Generally, the local storage device 24 accumulates chunks of one sequence number while transmitting a previously accumulated chunk (having the previous sequence number) to the remote storage device 26. Thus, while the local storage device 24 is accumulating writes from the host 22 that are assigned sequence number N, the writes that occurred for the previous sequence number (N−1) are transmitted by the local storage device 24 to the remote storage device 26 via the link 29. A chunk 54 represents writes from the host 22 that were assigned the sequence number N−1 that have not been transmitted yet to the remote storage device 26. The chunk that is in the process of being transmitted to the remote storage device may be referred to herein as the Transmit Cycle.

The remote storage device 26 receives the data from the chunk 54, which may be referred to herein as the Receive Cycle, corresponding to writes assigned a sequence number N−1 and constructs a new chunk 56 of host writes having sequence number N−1. The data may be transmitted using appropriate RDF protocol that acknowledges data sent across the link 29. When the remote storage device 26 has received all of the data from the chunk 54, the local storage device 24 sends a commit message to the remote storage device 26 to commit all the data assigned the N−1 sequence number corresponding to the chunk 56. Generally, once a chunk corresponding to a particular sequence number is committed, that chunk may be written to the logical storage device. This is illustrated in FIG. 2 with a chunk 58 corresponding to writes assigned sequence number N−2 (i.e., two before the current sequence number being used in connection with writes by the host 22 to the local storage device 26), which may be referred to herein as the apply cycle. In FIG. 2, the chunk 58 is shown as being written to a data element 62 representing disk storage for the remote storage device 26. Thus, the remote storage device 26 is receiving and accumulating the chunk 56 corresponding to sequence number N−1 while the chunk 58 corresponding to the previous sequence number (N−2) is being written to disk storage of the remote storage device 26 illustrated by the data element 62. In some embodiments, the data for the chunk 58 is marked for write (but not necessarily written immediately), while the data for the chunk 56 is not.

Thus, in operation, the host 22 writes data to the local storage device 24 that is stored locally in the data element 51 and is accumulated in the chunk 52. Once all of the data for a particular sequence number has been accumulated (described elsewhere herein), the local storage device 24 increments the sequence number. Data from the chunk 54 corresponding to one less than the current sequence number is transferred from the local storage device 24 to the remote storage device 26 via the link 29. The chunk 58 corresponds to data for a sequence number that was committed by the local storage device 24 sending a message to the remote storage device 26. Data from the chunk 58 is written to disk storage of the remote storage device 26.

Note that the writes within a particular one of the chunks 52, 54, 56, 58 are not necessarily ordered. However, as described in more detail elsewhere herein, every write for the chunk 58 corresponding to sequence number N−2 was begun prior to beginning any of the writes for the chunks 54, 56 corresponding to sequence number N−1. In addition, every write for the chunks 54, 56 corresponding to sequence number N−1 was begun prior to beginning any of the writes for the chunk 52 corresponding to sequence number N. Thus, in the event of a communication failure between the local storage device 24 and the remote storage device 26, the remote storage device 26 may simply finish writing the last committed chunk of data (the chunk 58 in the example of FIG. 2) and can be assured that the state of the data at the remote storage device 26 is ordered in the sense that the data element 62 contains all of the writes that were begun prior to a certain point in time and contains no writes that were begun after that point in time. Thus, R2 always contains a point in time copy of R1 and it is possible to reestablish a consistent image from the R2 device.

Figure 3:
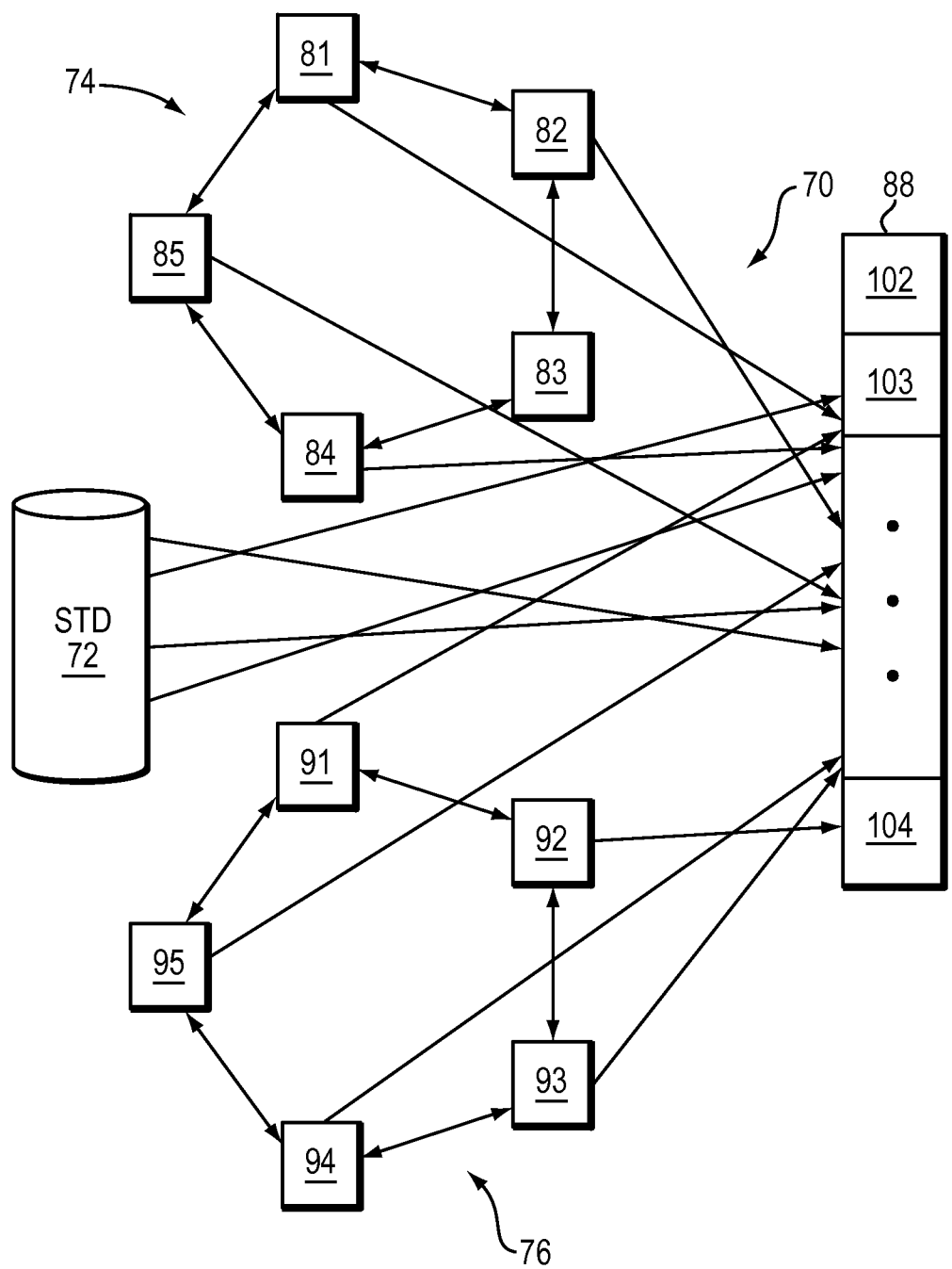
FIG. 3 is a schematic diagram illustrating items for constructing and manipulating chunks of data on a local storage device according to the system described herein, in accordance with an embodiment of the present disclosure.

Referring to FIG. 3, a diagram 70 illustrates items used to construct and maintain the chunks 52, 54. A standard logical device 72 contains data written by the host 22 and corresponds to the data element 51 of FIG. 2 and the disks 33*a*-33*c* of FIG. 1. The standard logical device 72 contains data written by the host 22 to the local storage device 24.

Two linked lists of pointers 74, 76 are used in connection with the standard logical device 72. The linked lists 74, 76 correspond to data that may be stored, for example, in the memory 37 of the local storage device 24. The linked list 74 contains a plurality of pointers 81-85, each of which points to a slot of a cache 88 used in connection with the local storage device 24. Similarly, the linked list 76 contains a plurality of pointers 91-95, each of which points to a slot of the cache 88. In some embodiments, the cache 88 may be provided in the memory 37 of the local storage device 24. The cache 88 contains a plurality of cache slots 102-104 that may be used in connection to writes to the standard logical device 72 and, at the same time, used in connection with the linked lists 74, 76.

Each of the linked lists 74, 76 may be used for one of the chunks of data 52, 54 so that, for example, the linked list 74 may correspond to the chunk of data 52 for sequence number N while the linked list 76 may correspond to the chunk of data 54 for sequence number N–1. Thus, when data is written by the host 22 to the local storage device 24, the data is provided to the cache 88 and, in some cases (described elsewhere herein), an appropriate pointer of the linked list 74 is created. Note that the data will not be removed from the cache 88 until the data is destaged to the standard logical device 72 and the data is also no longer pointed to by one of the pointers 81-85 of the linked list 74, as described elsewhere herein.

In an embodiment herein, one of the linked lists 74, 76 is deemed "active" while the other is deemed "inactive". Thus, for example, when the sequence number N is even, the linked list 74 may be active while the linked list 76 is inactive. The active one of the linked lists 74, 76 handles writes from the host 22, serving as the capture cycle, while the inactive one of the linked lists 74, 76 serves as the transmit cycle and corresponds to the data that is being transmitted from the local storage device 24 to the remote storage device 26.

While the data that is written by the host 22 is accumulated using the active one of the linked lists 74, 76 (for the sequence number N), the data corresponding to the inactive one of the linked lists 74, 76 (for previous sequence number N–1) is transmitted from the local storage device 24 to the remote storage device 26. The RA's 30a-30c use the linked lists 74, 76 to determine the data to transmit from the local storage device 24 to the remote storage device 26.

Once data corresponding to a particular one of the pointers in one of the linked lists 74, 76 has been transmitted to the remote storage device 26, the particular one of the pointers may be removed from the appropriate one of the linked lists 74, 76. In addition, the data may also be marked for removal from the cache 88 (i.e., the slot may be returned to a pool of slots for later, unrelated, use) provided that the data in the slot is not otherwise needed for another purpose (e.g., to be destaged to the standard logical device 72). A mechanism may be used to ensure that data is not removed from the cache 88 until all devices are no longer using the data. Such a mechanism is described, for example, in U.S. Pat. No. 5,537,568 issued on Jul. 16, 1996 and in U.S. patent application Ser. No. 09/850,551 filed on Jul. 7, 2001, both of which are incorporated by reference herein. A similar structure may be used on the remote storage device 26 to maintain the receive and apply cycles.

Figure 4:
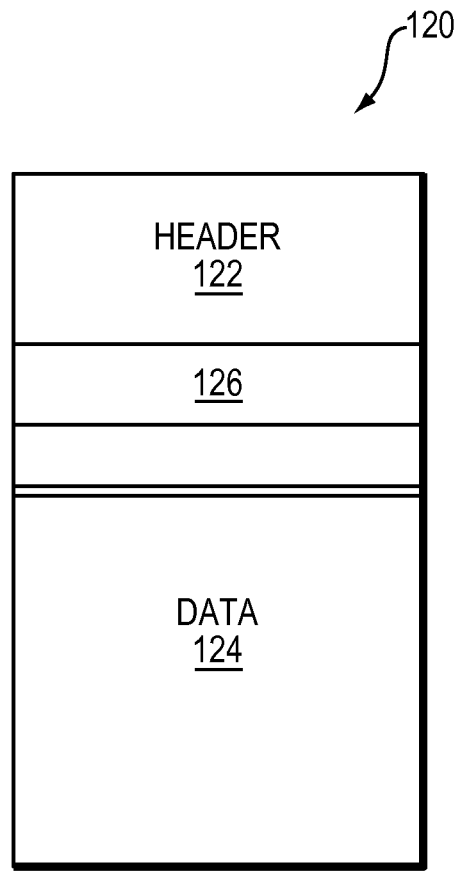
FIG. 4 is a diagram illustrating a data structure for a slot used in connection with the system described herein, in accordance with an embodiment of the present disclosure.

Referring to FIG. 4, a slot 120, like one of the slots 102-104 of the cache 88, includes a header 122 and data 124. The header 122 corresponds to overhead information used by the system to manage the slot 120. The data 124 is the corresponding data from the disk that is being (temporarily) stored in the slot 120. Information in the header 122 includes pointers back to the disk, time stamp(s), etc.

The header 122 also includes a cache stamp 126 used in connection with the system described herein. In an embodiment herein, the cache stamp 126 is eight bytes. Two of the bytes are a "password" that indicates whether the slot 120 is being used by the system described herein. In other embodiments, the password may be one byte while the following byte is used for a pad. As described elsewhere herein, the two bytes of the password (or one byte, as the case may be) being equal to a particular value indicates that the slot 120 is pointed to by at least one entry of the linked lists 74, 76. The password not being equal to the particular value indicates that the slot 120 is not pointed to by an entry of the linked lists 74, 76. Use of the password is described elsewhere herein.

The cache stamp 126 also includes a two byte field indicating the sequence number (e.g., N, N–1, N–2, etc.) of the data 124 of the slot 120. As described elsewhere herein, the sequence number field of the cache stamp 126 may be used to facilitate the processing described herein. The remaining four bytes of the cache stamp 126 may be used for a pointer, as described elsewhere herein. Of course, the two bytes of the sequence number and the four bytes of the pointer are only valid when the password equals the particular value that indicates that the slot 120 is pointed to by at least one entry in one of the lists 74, 76.

Extent Level Commands

Generally, an extent is defined by one or more contiguous storage locations on a logical, virtual, or physical storage medium. In certain embodiments, an extent may be contiguous cylinders or tracks in a disk storage system. In other embodiments, an extent may be a contiguous storage location in a virtual or logical storage medium. In some embodiments, the logical or virtual extent may not correspond to a contiguous portion on physical storage and may correspond to a mapping of one or more extents. In certain embodiments, an extent may have a number of logical to logical or physical mappings. A command which operates on an extent, such as UNMAP, WRITE SAME, or XCOPY, may change data for the one or more contiguous storage locations as defined by the extent. For example, in some embodiments, a block SCSI operation can delete or copy an extent of data.

Figure 5:
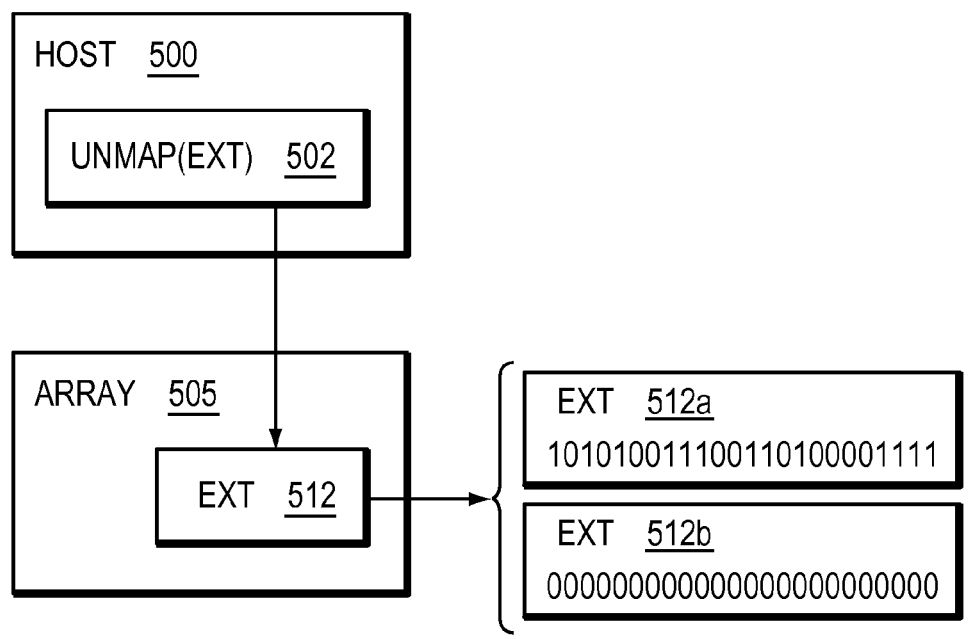
FIG. 5 is a diagram illustrating an UNMAP command applied to an extent, in accordance with an embodiment of the present disclosure.

Typically an UNMAP command is an extent based command which may tell the storage that the blocks are not used any more, and is often implemented by zeroing these blocks. Generally, in some data storage systems such as the Symmetrix, it may be implemented by physically writing zeroes or logically indicating that an extent of blocks has been erased. Conventionally, it may be possible to execute an UNMAP command very quickly, even for very large extents of data, on a storage system using a logical indicator. For example, refer to the example embodiment of FIG. 5. An UNMAP command 502 is sent from host 500 to array 505 telling array 505 to zero extent 512. Ext 512a represents the extent with data before the UNMAP command and extent 512b represents the zeroed extent after the execution of the UNMAP command. Conventionally, a WRITE SAME command may be used to clear data. Usually, a WRITE SAME command copies a small chunk of data over a storage extent. Typically, the data being copied is all zeroes, resulting in writing zeroes to the entire extent.

Generally, an XCOPY command may copy an extent of blocks from one volume or location to another. On a traditional array, XCOPY may be implemented using cloning of data volumes or extents of blocks between volumes in the same storage array in the following way: every block of data in the copy source may be marked with a protection indication, every block of data in the copy target may marked with an indirect indication, pointing back to the source, and a background process may traverse these indications and resolve them, by copying a protected block to its target, removing the protection indication from the source, and removing the indirect indication from the target. In certain embodiments, protection and indirection may be resolved on demand when an IO is attempted to a block that is either protected or indirect. In these embodiments, the IO may be paused, and before IO is executed, the protection/indirection is resolved.

Figure 6:
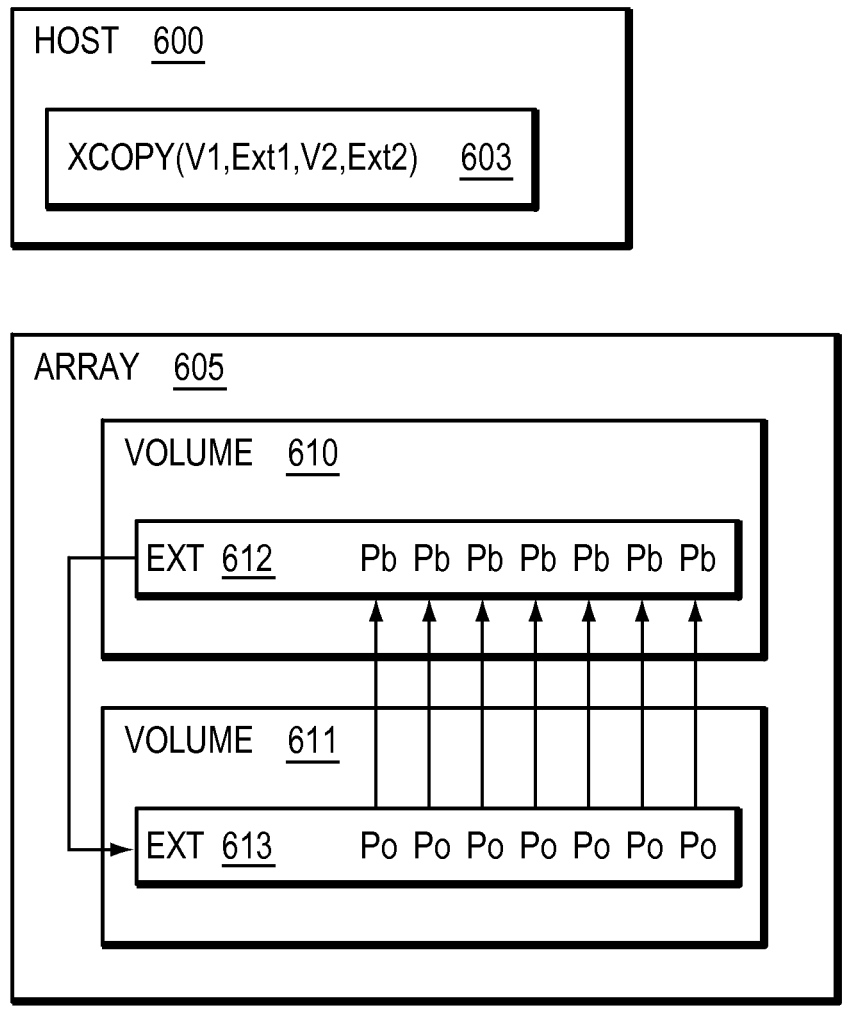
FIG. 6 is a diagram illustrating an XCOPY command applied to an extent, in accordance with an embodiment of the present disclosure.

Refer now to the example embodiment of FIG. 6. In FIG. 6, XCOPY command 603 is sent from host 600 to array 605 to XCOPY extent 612 to extent 613. XCOPY command 603 contains a first volume V1, corresponding to Volume 620, a first extent Ext 1 corresponding to extent 612, a second volume V2 corresponding to volume 611, and a second extent Ext2 corresponding to extent 613. The data in extent 613 on volume 611 may be set to point to the data on extent 612 on volume 610. The data on extent 612 may be set to be protected until the data copy is finished. In this embodiment, in the background, the data may be copied from extent 612 to 613, removing the pointer and protection on the source of the XCOPY. In this embodiment, on a write to a protected piece of extent 612, the data may be copied to extent 613 before the write is executed. If the data is overwritten on extent 613, then a protection bit on extent 612 may be removed. If a read is to occur on volume 611, the read may either be redirected to extent 612 or the read may be paused and the extent may be immediately copied from extent 612 to extent 613.

Generally, when volumes are also part of a replication relationship, it may be required to mirror or replicate an operation, such as an extent level commands like UNMAP or XCOPY, on the peer or replicated array. Typically, the execution of extent level commands on the peer array may need to obey the same serialization rule or order that governs their execution on the primary array. Generally, when the host issues two commands in a sequence, where each command is either a normal write or an extent level command, the array must execute the two commands in the same order. Conventionally, obeying this rule on a remote peer that is related to the primary array through an asynchronous replication mechanism is difficult because extent level operations often affect a large amount of data that collides with other writes in the replication cycle.

Thus, conventional techniques may not be able to implement these types of extent commands in a replicated storage system during asynchronous replication. For example, typically the UNMAP command may need to be executed in sequence with other IO and such sequence ordering may not be enforceable using a conventional asynchronous replication mechanism. Typically, if sequence ordering is not enforced in a conventional system, an UNMAP and write command may be executed out of order resulting in data corruption.

Similarly, conventional techniques may also not be able to correctly replicate an XCOPY command, as the correct sequence order may not be enforced on the remote peer array when a write sequence includes XCOPY commands. Thus, conventional techniques may not be used to replicate an XCOPY command. For example, typical techniques do not have a mechanism to interpret and execute the XCOPY command in sync with other IO to ensure that data is not lost.

In certain embodiments of the current disclosure, mass delete and copy commands (such as UNMAP, WRITE SAME, and XCOPY) may be processed on volumes protected via asynchronous replication, while preserving the consistency of the remote volumes. In some embodiments, correct replication of moving virtual machines (such as with VMware's Storage vMotion) and file deletion protocols (such as VMFS UNMAP extensions or other file systems) may be enabled.

UNMAP

Figure 7:
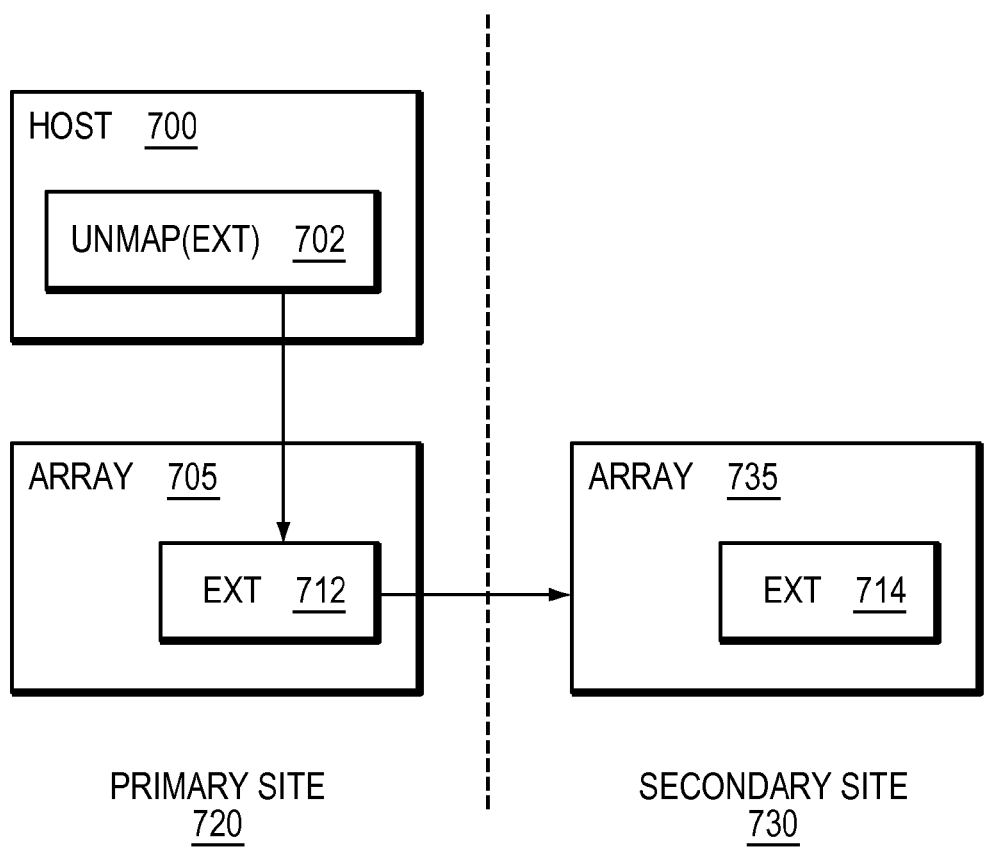
FIG. 7 is a diagram illustrating an UNMAP command applied to extents on primary and a secondary site, in accordance with an embodiment of the present disclosure.

In a particular embodiment, an UNMAP command may be sent to a primary device, which is being replicated asynchronously, while maintaining data fidelity on the secondary site. In most embodiments, the results of the UNMAP may be reflected in the device's replicated peer, a device in a secondary storage array. For example, referring to the example embodiment of FIG. 7, the UNMAP command 702 which may zero extent 712 on array 705 may need to be replicated on array 705 by also zeroing extent 714.

In some embodiments, asynchronous replication systems such as Symmetrix SRDF/A collect IO into cycles. In these embodiments, cycles may create time ordered consistent chunks of data, where the order of writes within each cycle is immaterial, and the writes in cycle may be sent out of order. In certain embodiments, once a cycle has been transferred, it may be committed on the replication device and become part of the available data.

Generally, with asynchronous replication, it may not be sufficient to enter an UNMAP command into the cycle, since the tracks in each cycle may be transmitted out of order. For example, conventionally the cycle may have writes for tracks inside the extent. Generally, if a write occurred to a location before an UNMAP command, it may need to be deleted; if it happened after the UNMAP, it may need to be written after the UNMAP command is executed. Typically, during a single cycle the same block can be written and erased multiple times.

Refer now to the example embodiment of FIG. 8. In FIG. 8, timeline 810 illustrates some sample commands captured during a timeline for a single cycle which may be sent to the replication site. At time T0: the cycle is created. At time T1: blocks 10-30 are written. At time T2: blocks 40-50 are written. At time T2 blocks 20-55 are UNMAPPED or erased. At time T4: blocks 22-25 are written. Typically, sending these commands out of order may erase good data or may not erase data that needs to be erased. Generally, this may result in an inconsistent replica at the target array or replication site.

In an embodiment, the UNMAP command may be applied first in a capture cycle, before any subsequent writes. In some embodiments, it may be ensured that the UNMAP command is the first command to be executed in each apply cycle. In certain embodiments, each cycle may contain a header that records all the UNMAP commands that have been received for this cycle. In certain embodiments, a new cycle may be created with an empty header. In most embodiments, the header may describe the extents on any volume that should be erased before the cycle data is allowed to be recorded on the target array. In some embodiments, this data may overlap with previous extents. In alternative embodiments, the header may be for the entire cycle or per volume. In certain embodiments, after the UNMAP data is placed in the header, the data of subsequent writes may be included in the cycle to be transmitted to the replication site.

For example, refer to the example embodiments of FIGS. 7-11. The extents in the UNMAP command of timeline 810 of FIG. 8 are added to the capture cycle header (step 910) as exemplified in Cycle 1110. The data in timeline 810 is scanned and data that may have been erased by the UNMAP command is removed and not entered in cycle 1110 (step 920). For example, during Step 920 it may determine whether a slot to be removed is inside an extent to be erased (Step 1010). If the slot is inside the extent to be erased, the slot is removed from the cycle (e.g. a slot may contain write-pending data for blocks 20-30 while the UNMAP extent is 10-50 and thus the slot may be removed) (step 1120). If the slot is not within the extent, then the portion of the slot within the extent may be removed (e.g. UNMAP command for blocks 10 through 50 may be sent while the cycle has a slot with data for blocks 45-55 and the data for 45-50 may be removed from the slot.) (step 1130). In some embodiments, where the slot is not contained within the extent, the erase may be performed by marking these blocks as not-in-cache and not write-pending. In an alternative embodiment, the blocks may be physically overwritten with zeroes. In yet a further alternative embodiment, as shown in cycle 1120, the UNMAP command may be split so that data to be written in a cycle is not also overwritten by the UNMAP command saving unnecessary writing to the volumes.

Cycle 1110 may be sent to replication site 735 (step 1030). The UNMAP data may be applied by translating the received cycle header into UNMAP commands and executing them on the array 735 (step 1040). The rest of cycle data 1110 may be processed i.e., set the data to write-pending locally (step 1050).

XCOPY

Typically, conventional asynchronous replication mechanisms may not be able to handle the correct sequence order of XCOPY commands and regular write operations, when the target of the XCOPY command is a storage device that is being replicated by the asynchronous replication mechanism. Generally, when the size of the XCOPY extent is very large, this problem may become intractable unless the source of the XCOPY command is subject to the same asynchronous replication mechanism. Conventionally, for example, the source may be replicated to the same peer array as the target as part of the same consistency group. However, when the source and the target extents of the XCOPY command are controlled by the same asynchronous replication mechanism, conventional replication techniques may not ensure the correct sequence ordering of the XCOPY command and other write commands.

Figure 12:
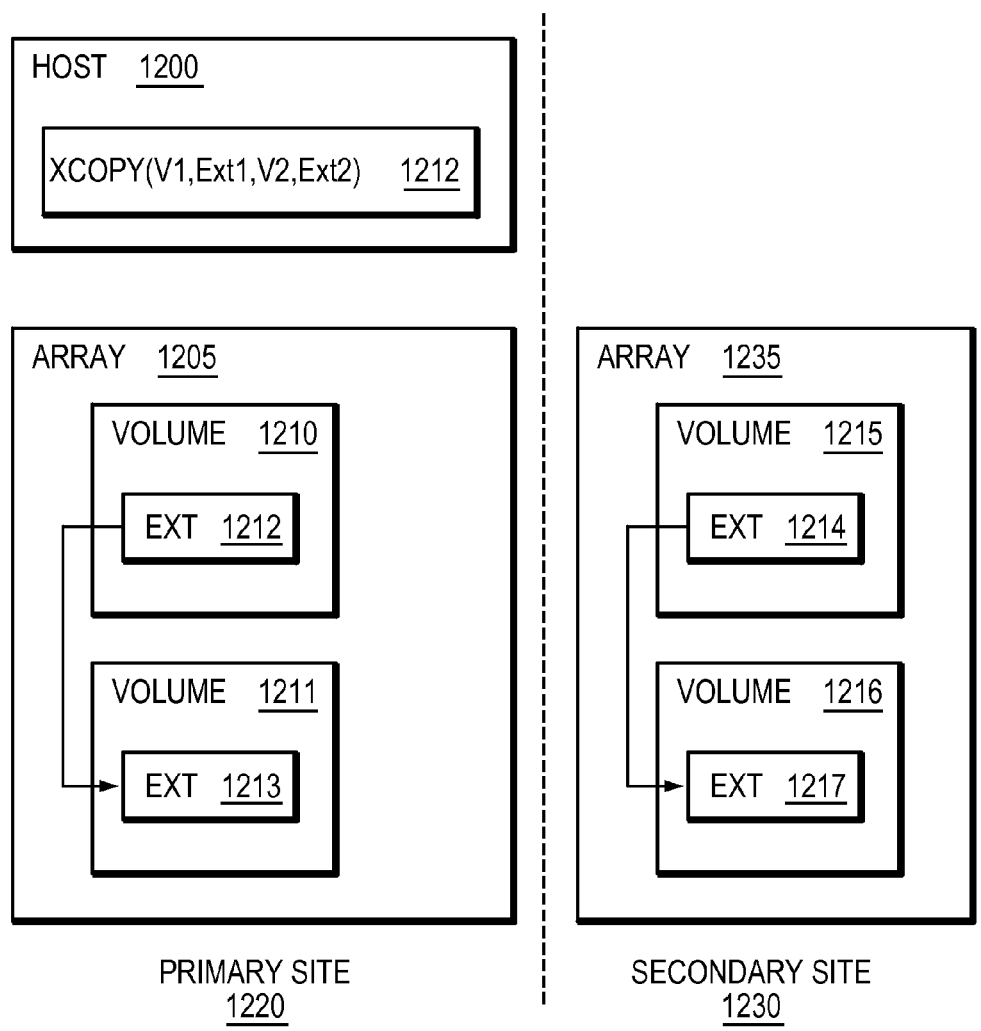
FIG. 12 is a diagram illustrating an XCOPY command applied to extents on primary and a secondary site, in accordance with an embodiment of the present disclosure.

Refer now to the example embodiment of FIG. 12. In FIG. 12 XCOPY command 1212 may copy extent 1212 from volume 1210 to extent 1213 of volume 1211. As the IO of array 1205 is being replicated to array 1235, this command may need to be replicated so that extent 1214 on volume 1215 is copied to extent 1217 on volume 1216.

Refer now to the example embodiment of FIG. 13. FIG. 13 timeline 1310 shows IO executed during timeline 1310 where data may be captured to be replicated to the secondary site. If the IO were executed out of order, fidelity on the replication may be lost if, for example, blocks 10-30 on volume 1 were overwritten before blocks 10-30 were copied to volume 2. Thus, XCOPY may need to be implemented sequentially with respect to other IO.

Figure 14:
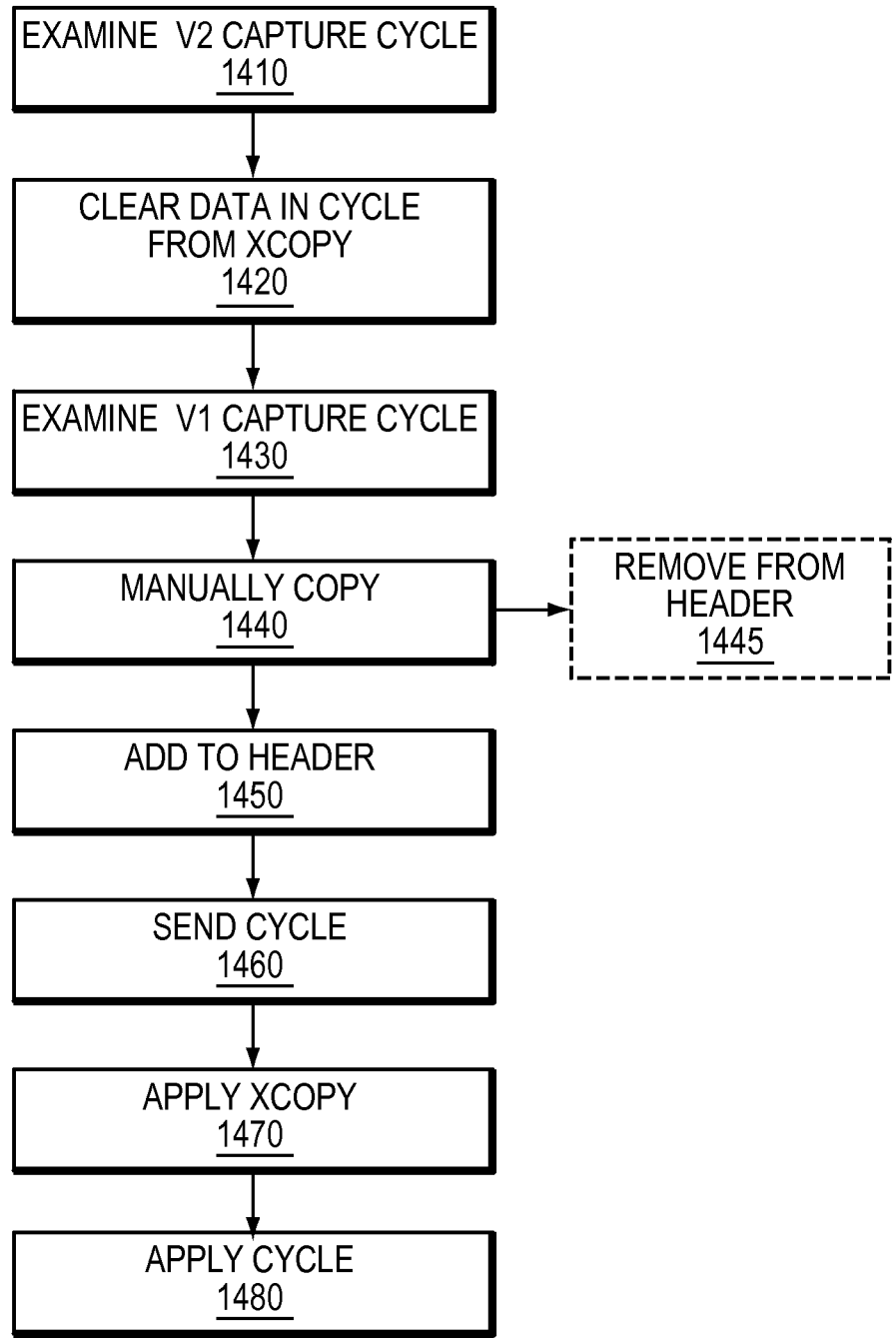
FIG. 14 is an example of an embodiment of a method for removing XCOPY blocks from a cycle that may utilize the techniques described herein, in accordance with an embodiment of the present disclosure.

Refer to the example embodiments of FIGS. 12, 13, and 14. The steps of FIG. 14 are applied to the timeline 1310 as the data is replicated from primary site 1220 to secondary site 1230. The capture cycle for volume 1211 is examined (step 1410). Data in the range of the XCOPY command is cleared, in this example the write to blocks 15-20 on volume 1211 (step 1420). The capture cycle on volume 1210 is examined (step 1430). For the parts of the cycle that corresponds to the data to be copied by the XCOPY command to the target volume, the data is entered into the cycle for volume 1211 as a new slot in the capture cycle for volume 1211, i.e. the write to blocks 15-20 on volume 1210 may be entered as a write to volume 1213 on volume 1211. The XCOPY command is added to the cycle header (step 1450). The cycle is sent to the target array (step 1460). The XCOPY command is applied (step 1470). The cycle is applied at the target array (step 1480).

In some embodiments, when the XCOPY command is received on the Primary Site, it may be executed locally similar to other XCOPY commands, resulting in Protection bits set on the source volume 1210 for the extent 1212, as well as indirect pointers may be set on the target volume 1211 for the extent 1213. In some embodiments, during the time the cycle exists in the array 1205, any writes to the two extents related to the XCOPY may be intercepted and handled according to the rules specified herein. In particular embodiments, a write to the source volume 1210 in the extent 1212 may trigger copying the data prior to the right to the target block in volume 1211, which may result in new data in the cycle for volume 1211. In most embodiments, this data may eventually be transferred to the remote array as part as the normal cycle processing.

In other embodiments, when the XCOPY command is processed on array 1235 volumes 1215 and 1216 in the secondary site 1230, the XCOPY command may be executed like other XCOPY command, which may result in protection bits set on 1215 and indirect pointers set on 1216. In these embodiments, additional writes in the cycles that arrive at 1215 and 1216 may trigger data copying. In an alternative embodiment, the example embodiment in FIG. 14 may perform the additional step of removing block ranges from the cycle header to be sent to the remote array for the data that has been manually copied (Step 1440).

Referring now to the example embodiments in FIG. 15. Timeline 1510 represents five time sequence steps that denote writes and XCOPY command to be captured, transmitted to, and applied to the second array. Cycle 1520 represents a sample header where the additional step, step 1445 of FIG. 14, has not been applied. Cycle 1530 represents a sample header where the additional step, step 1445 of FIG. 14, has been applied. In cycle 1530, the extent changed from 10-30 to 10-14 & 21-24, as blocks 15-20 are copied manually and blocks 25-30 were overwritten after the XCOPY command was issued. In some embodiments, this additional step may ensure that some data may not have to be copied twice to the device or devices on the second site, once through the XCOPY command and another time through a copy step to ensure that stale data from an XCOPY is removed.

In embodiments, without the additional step, the XCOPY may copy the entire range 10-30, including stale data, but the next step—applying the capture cycle—may overwrite the stale data with the correct data. In the alternative embodiments, the XCOPY command may be punched to remove the data that may be overwritten as shown in Cycle 1530 of FIG. 15. In this embodiment, the XCOPY commands may not duplicate writes on the replication site.

Figure 16:
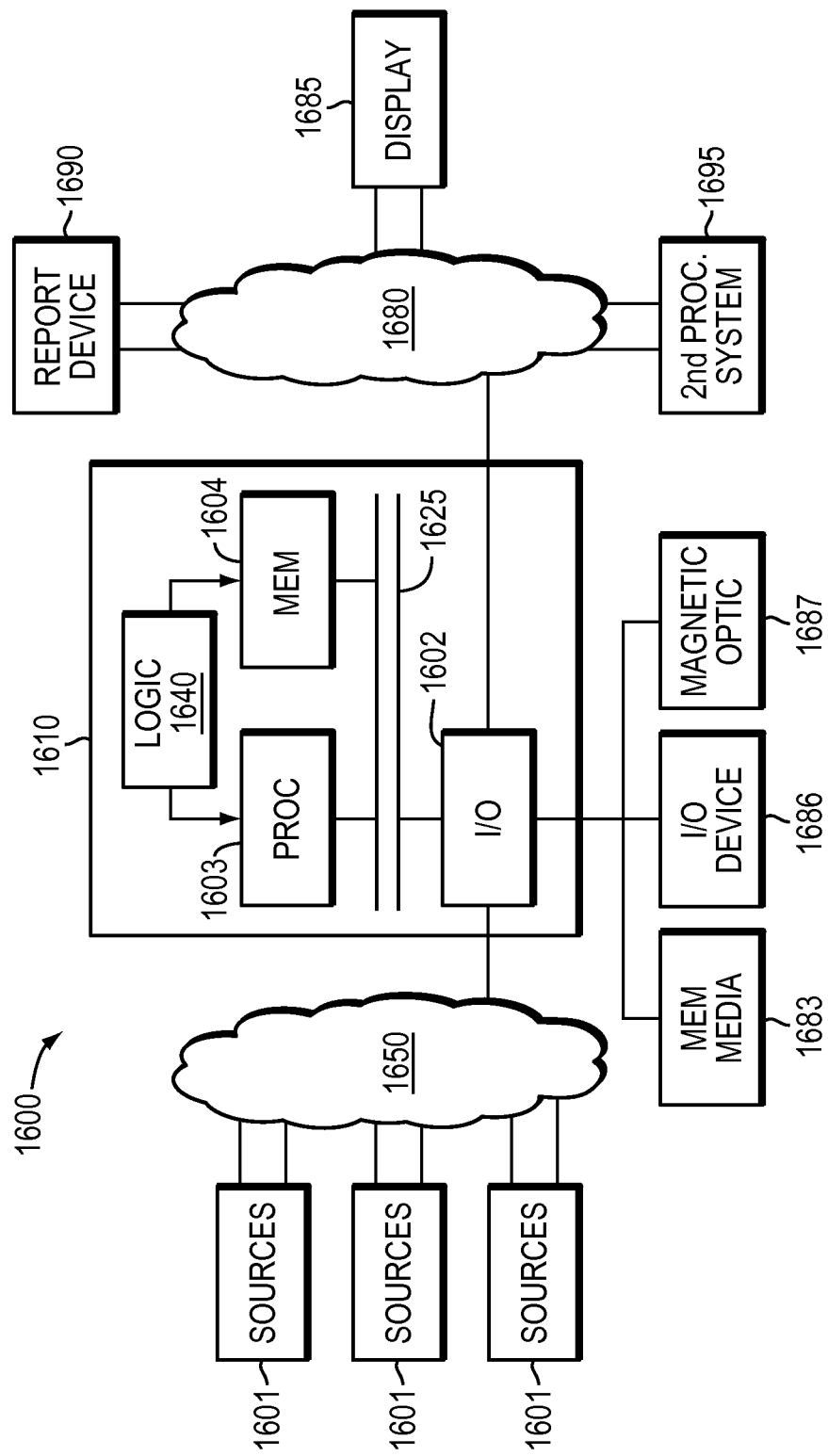
FIG. 16 is an example of an embodiment of an apparatus that may utilize the techniques described herein, in accordance with an embodiment of the present invention.
Figure 17:
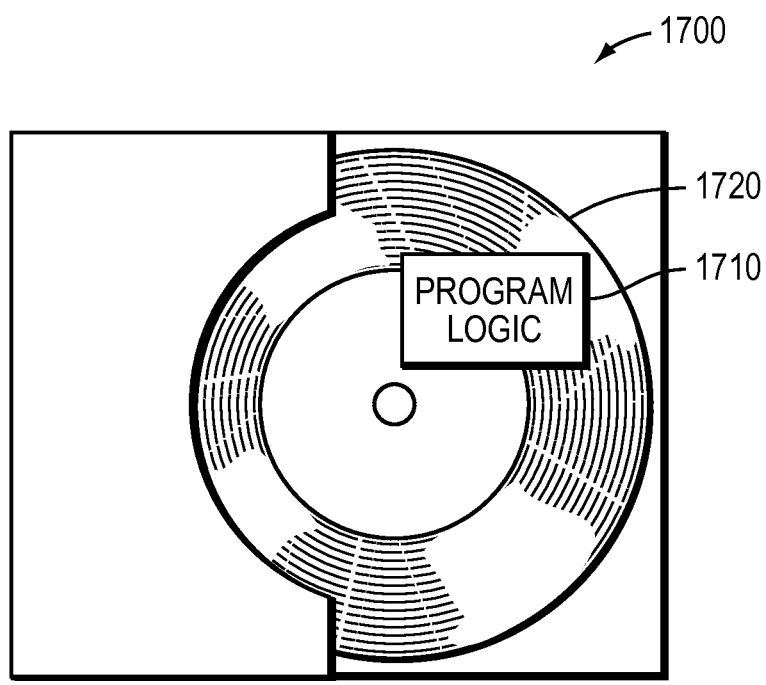
FIG. 17 is an example of an embodiment of a method embodied on a computer readable storage medium that may utilize the techniques described herein, in accordance with an embodiment of the present invention.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 16, the machine becomes an apparatus for practicing the invention. When implemented on one or more general-purpose processors, the program code combines with such a processor 1603 to provide a unique apparatus that operates analogously to specific logic circuits. As such a general purpose digital machine can be transformed into a special purpose digital machine. FIG. 17 shows Program Logic 1734 embodied on a computer-readable medium 1730 as shown, and wherein the Logic is encoded in computer-executable code configured for carrying out the reservation service process of this invention and thereby forming a Computer Program Product 1700. The logic 1734 may be the same logic 1640 loaded on memory 1604 loaded on processor 1603. The program logic may also be embodied in software modules, as modules, or as hardware modules.

Figure 9:
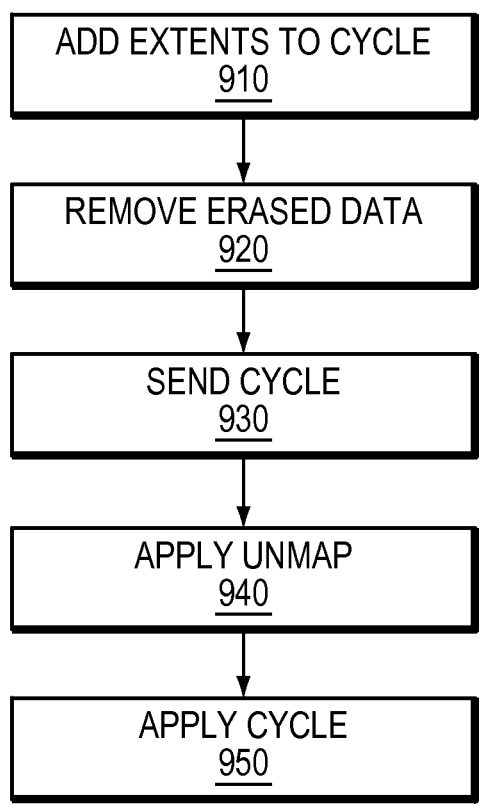
FIG. 9 is an example of an embodiment of a method for removing UNMAP blocks from a cycle that may utilize the techniques described herein, in accordance with an embodiment of the present disclosure.
Figure 10:
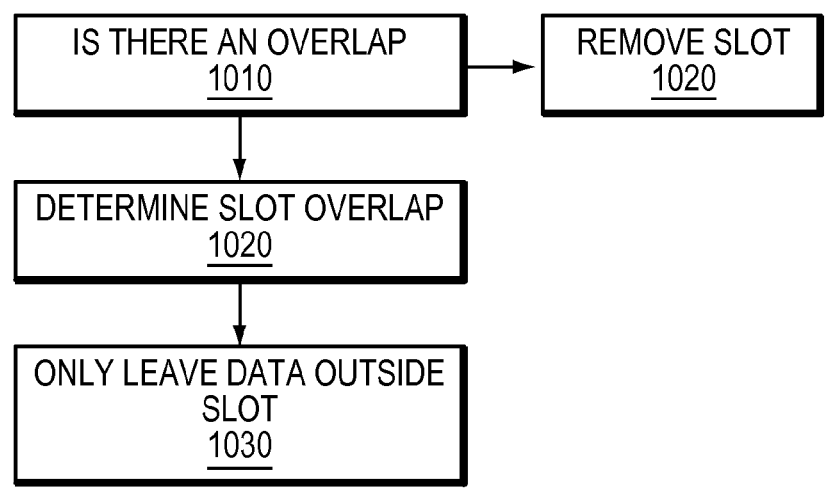
FIG. 10 is an example of an embodiment of a method for removing UNMAP blocks that may be overwritten in a cycle that may utilize the techniques described herein, in accordance with an embodiment of the present disclosure.

The logic for carrying out the method may be embodied as part of the system described below, which is useful for carrying out a method described with reference to embodiments shown in, for example, FIG. 9 and FIG. 15. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A method of ordering data IO captured at a primary site to be applied at a secondary site, comprising:
    examining the captured data IO to be applied to the secondary site at the first site for one or more extent portions, wherein the one or more extent portions includes data associated with the execution of an extent level command;
    removing the one or more extent portions from the captured data IO;
    determining if the one or more extent portions are time sequenced to overwrite a portion of the remaining captured data IO;
    based on a determination that the portion is to be overwritten, removing the overwritten portion from the remaining captured data IO; and
    ordering the one or more extent portions to be applied at the secondary site before the remaining captured data IO.

2. The method of claim 1 wherein the captured data IO to be applied at the secondary site is stored in a cycle; wherein the cycle contains a cycle header and a data to be applied at the secondary site; and wherein the one or more extent portions are placed within the cycle header.

3. The method of claim 1 further comprising: applying the extent portions and applying the remaining captured data IO at the secondary site.

4. The method of claim 1 wherein the extent level command is an UNMAP command.

5. The method of claim 1 wherein the extent level command is an XCOPY command.

6. The method of claim 3 further comprising:
    determining if a second portion of the remaining captured data IO is time sequenced to overwrite a part of the one or more extent portions;
    based on a positive determination that the second portion of the remaining captured data IO is to overwrite to overwrite part of the one or more extent portions, modifying one or more extent portions to remove the part of the extent portions overwritten by the second portion of the remaining captured data IO.

7. The method of claim 1 wherein the extent level command is a WRITE SAME command.

8. A computer program product for use in data protection comprising:
    a non-transitory computer readable medium encoded with computer executable program code for optimizing storage performance in a replication environment, the code configured to enable the execution of:
    examining the captured data IO to be applied to the secondary site at the first site for one or more extent portions, wherein the one or more extent portions includes data associated with the execution of an extent level command;
    removing the one or more extent portions from the captured data IO;
    determining if the one or more extent portions are time sequenced to overwrite a portion of the remaining captured data IO;
    based on a determination that the portion is to be overwritten, removing the overwritten portion from the remaining captured data IO; and
    ordering the one or more extent portions to be applied at the secondary site before the remaining captured data IO.

9. The program product of claim 8 wherein the captured data IO to be applied at the secondary site is stored in a cycle; wherein the cycle contains a cycle header and a data to be applied at the secondary site; and wherein the one or more extent portions are placed within the cycle header.

10. The program product of claim 8 wherein the executable program code is further configured for execution of:
    applying the extent portions and applying the remaining captured data IO at the secondary site.

11. The program product of claim 8 wherein the extent level command is an UNMAP command.

12. The program product of claim 8 wherein the extent level command is an XCOPY command.

13. The program product of claim 10 wherein the executable program code is further configured for execution of:
    determining if a second portion of the remaining captured data IO is time sequenced to overwrite a part of the one or more extent portions;
    based on a positive determination that the second portion of the remaining captured data IO is to overwrite to overwrite part of the one or more extent portions, modifying one or more extent portions to remove the part of the extent portions overwritten by the second portion of the remaining captured data IO.

14. The program product of claim 8 wherein the extent level command is a WRITE SAME command.

15. A system for data protection, the system comprising:
    one or more processors;
    a primary site, the first site comprising a logical storage medium;
    a secondary site, the second site comprising a logical storage medium; and
    computer-executable logic operating in memory, wherein the computer-executable program logic is configured for execution of:
examining the captured data IO to be applied to the secondary site at the first site for one or more extent portions, wherein the one or more extent portions includes data associated with the execution of an extent level command;
    removing the one or more extent portions from the captured data IO;
    determining if the one or more extent portions are time sequenced to overwrite a portion of the remaining captured data IO;
    based on a determination that the portion is to be overwritten, removing the overwritten portion from the remaining captured data IO; and ordering the one or more extent portions to be applied at the secondary site before the remaining captured data IO.

16. The system of claim 15 wherein the captured data IO to be applied at the secondary site is stored in a cycle; wherein the cycle contains a cycle header and a data to be applied at the secondary site; and wherein the one or more extent portions are placed within the cycle header.

17. The system of claim 15 wherein the computer executable logic is further configured for execution of:
applying the extent portions and applying the remaining captured data IO at the secondary site.

18. The system of claim 15 wherein the extent level command is an UNMAP command.

19. The system of claim 15 wherein the extent level command is an XCOPY command.

20. The system of claim 17 wherein the computer executable logic is further configured for execution of:
determining if a second portion of the remaining captured data IO is time sequenced to overwrite a part of the one or more extent portions;
based on a positive determination that the second portion of the remaining captured data IO is to overwrite part of the one or more extent portions, modifying one or more extent portions to remove the part of the extent portions overwritten by the second portion of the remaining captured data IO.

* * * * *